(12) United States Patent
Ennis

(10) Patent No.: US 8,215,476 B2
(45) Date of Patent: Jul. 10, 2012

(54) CORRELATOR FOR INTRODUCING VEHICLE TIRES INTO A CONVEYER OF A VEHICLE WASHING SYSTEM

(76) Inventor: G. Thomas Ennis, Inglewood, CA (US)

(*) Notice: Subject to any disclaimer, the term of this patent is extended or adjusted under 35 U.S.C. 154(b) by 197 days.

(21) Appl. No.: 12/730,467

(22) Filed: Mar. 24, 2010

(65) Prior Publication Data
US 2011/0236160 A1 Sep. 29, 2011

(51) Int. Cl.
*B65G 47/82* (2006.01)
(52) U.S. Cl. .......... 198/597; 104/242; 414/257
(58) Field of Classification Search .......... 198/597, 198/598, 835; 414/257, 278, 285, 331.09, 414/331.17, 398, 426; 104/242, 172.1, 172.2, 104/172.3, 172.4, 172.5
See application file for complete search history.

(56) References Cited

U.S. PATENT DOCUMENTS

| | | | | |
|---|---|---|---|---|
| 2,846,088 A * | 8/1958 | Porter | ........................... | 414/256 |
| 2,889,086 A * | 6/1959 | Collins | ................... | 222/402.22 |
| 3,371,620 A * | 3/1968 | Furukawa | ..................... | 414/228 |
| 3,942,720 A * | 3/1976 | Crutchfield | ................ | 193/35 R |
| 4,039,075 A * | 8/1977 | Gray | ............................. | 198/746 |
| 5,338,143 A * | 8/1994 | Matsuda et al. | ............. | 414/257 |
| 7,302,894 B2 * | 12/2007 | Belanger et al. | ............. | 104/242 |
| 7,571,682 B2 * | 8/2009 | Bianco | .......................... | 104/242 |
| 7,607,395 B2 * | 10/2009 | Belanger et al. | ............. | 104/107 |

* cited by examiner

*Primary Examiner* — James R Bidwell
(74) *Attorney, Agent, or Firm* — Risso & Associates; Marcus Risso

(57) ABSTRACT

Described is a correlator for introducing vehicle tires into a conveyor of a vehicle washing system. The correlator includes a frame with two laterally and freely rotatable belts. A set of angled curb rails resides over one of the belts to direct the vehicle's tires into a set of guide rails. As a roller pushes the rear tire of the vehicle onto the belts, the angled curb rails provide a lateral force to the tires. Because the belts are free-rolling, they are capable of rotating to move the tire laterally and shift the position of the vehicle to align the vehicle with the conveyor.

8 Claims, 10 Drawing Sheets

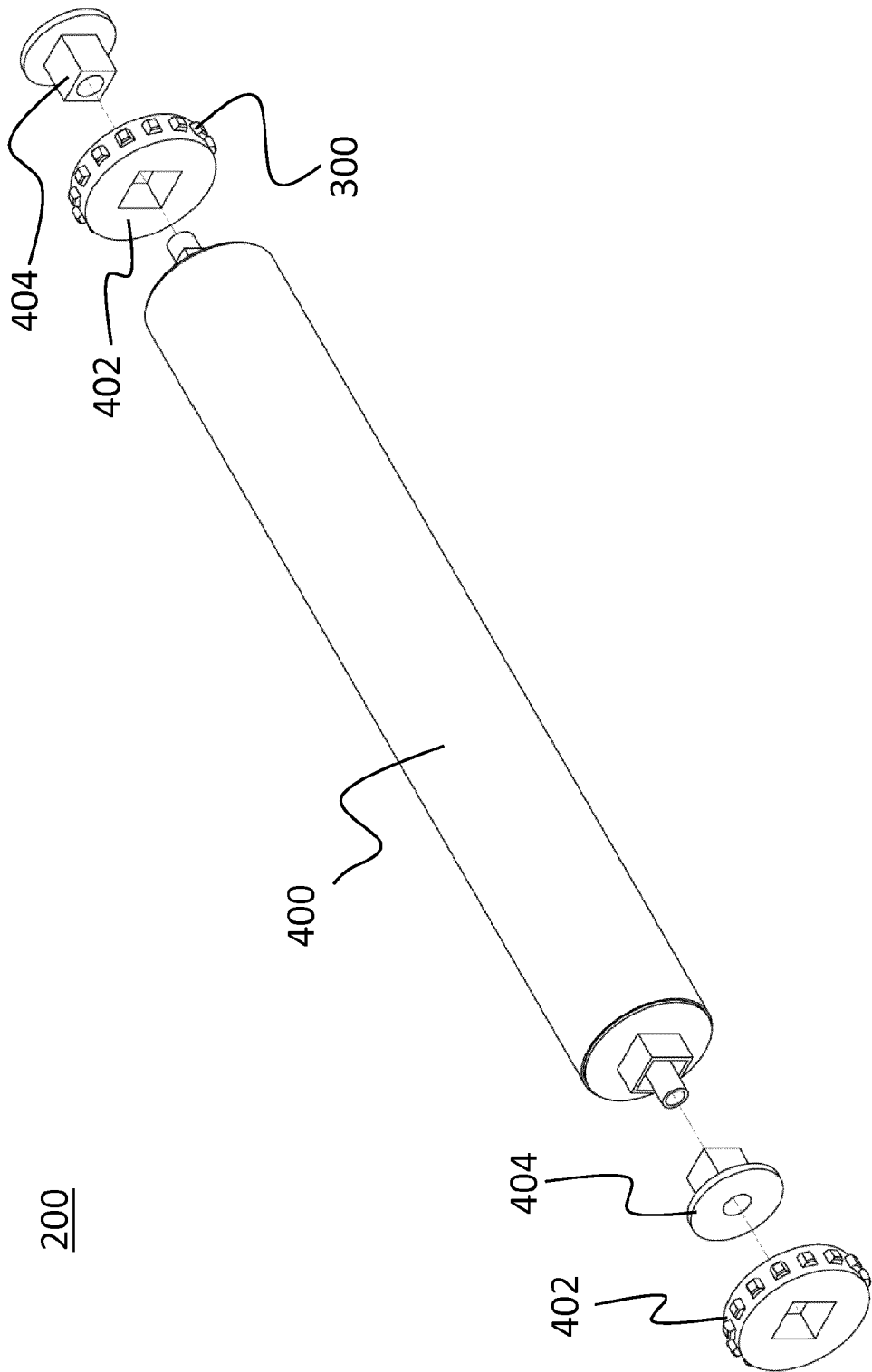

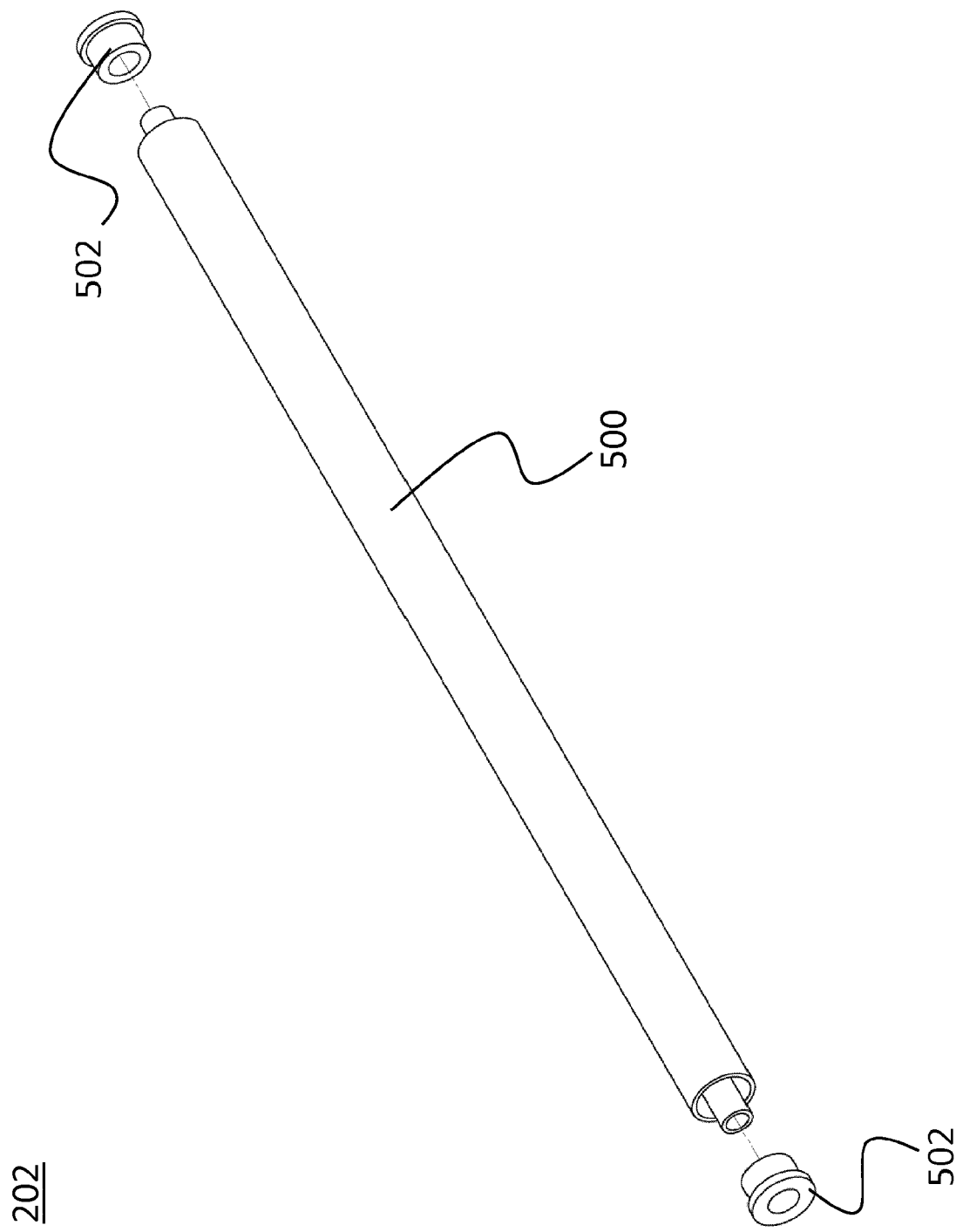

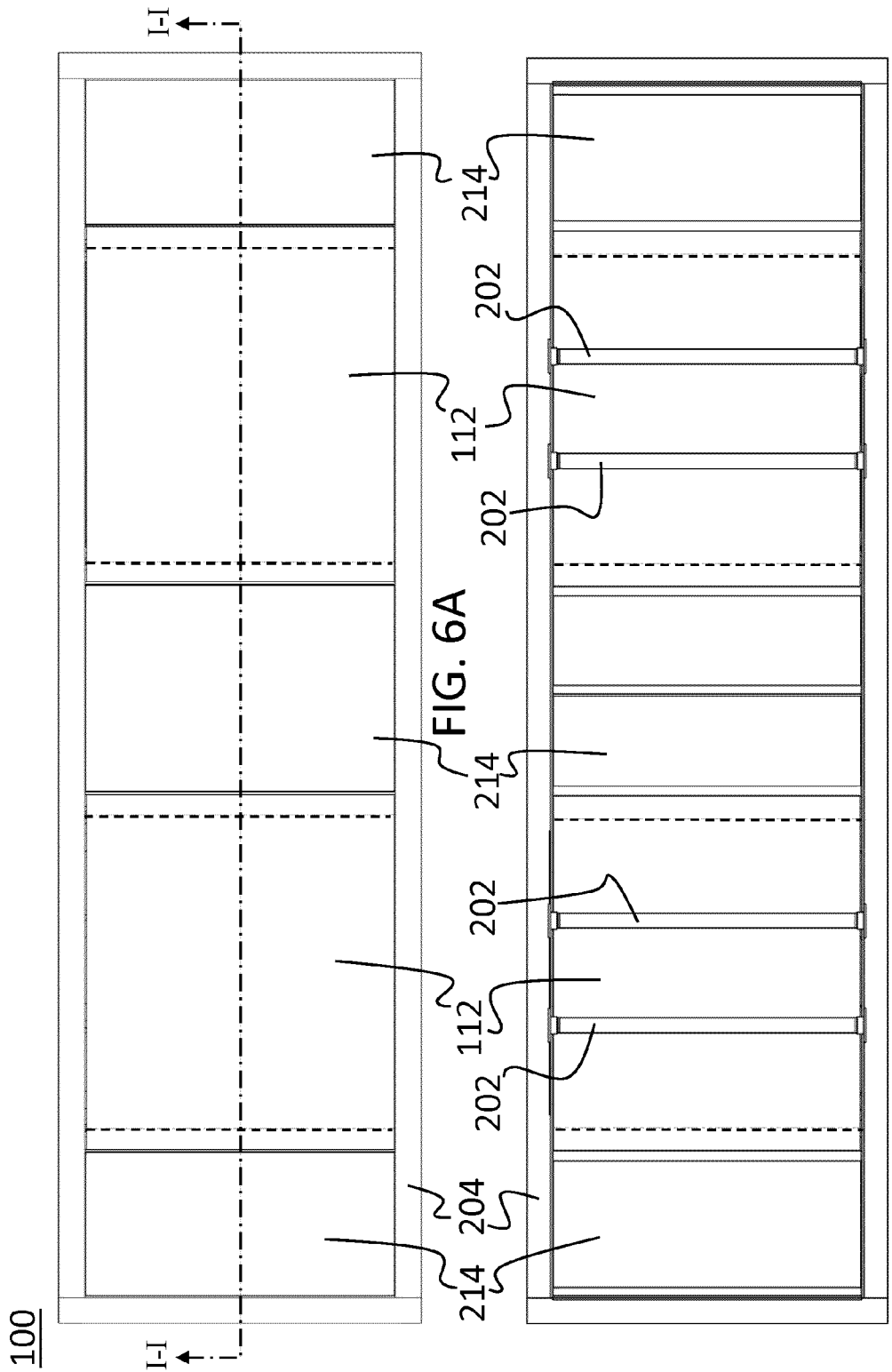

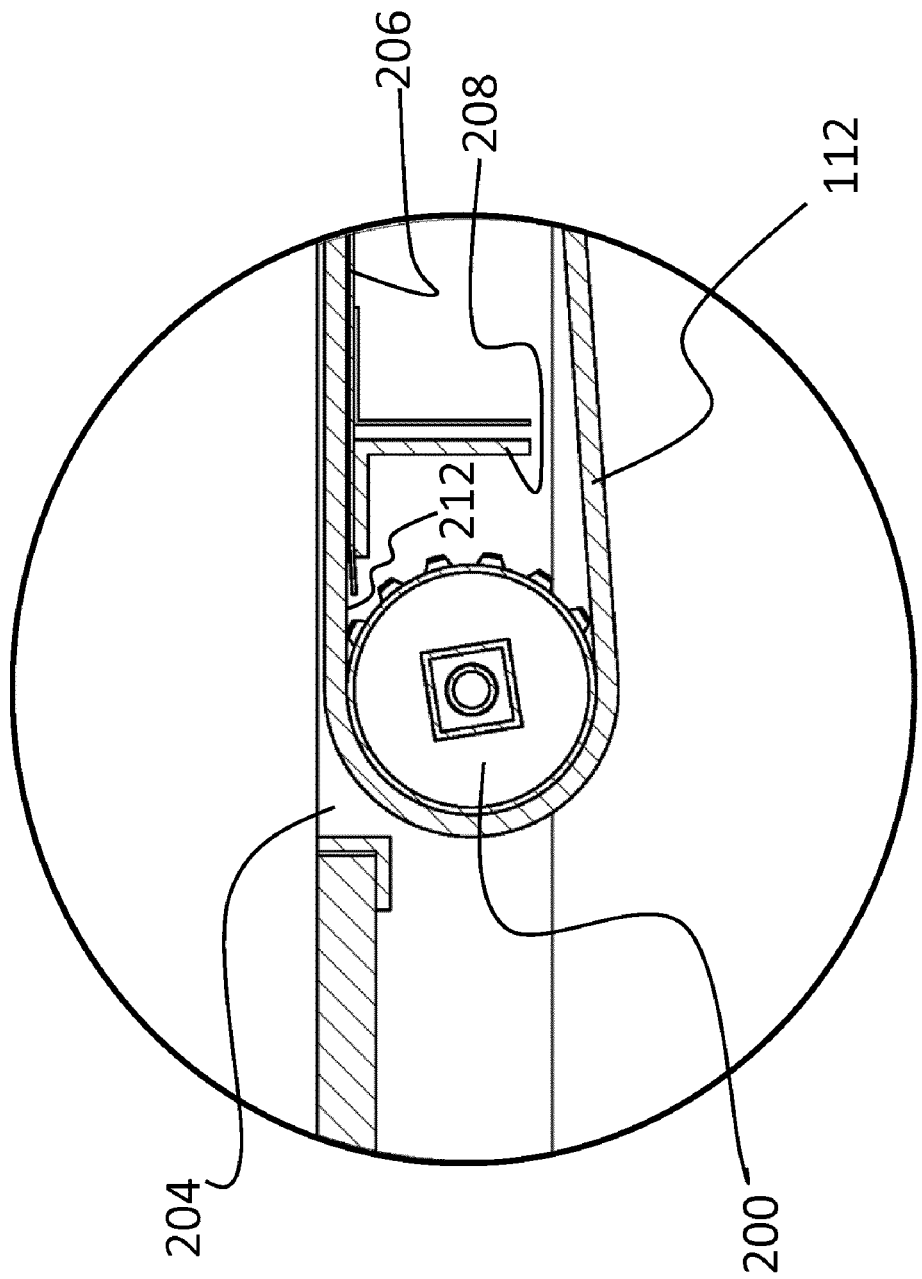

CORRELATOR FOR INTRODUCING VEHICLE TIRES INTO A CONVEYER OF A VEHICLE WASHING SYSTEM

BACKGROUND OF THE INVENTION (1) Field of Invention

The present invention relates to a correlator and, more particularly, to a correlator for altering a position of vehicle tires prior to introduction into a conveyer of a vehicle washing system.

(2) Description of Related Art

Vehicle washing systems have long been known in the art. By way of example, automatic vehicle-washing systems are well-known and are in widespread use for washing passenger automobiles, trucks, buses, railroad equipment, and the like. A typical system includes a conveyor for moving the vehicle through the installation, and a series of power-driven brushes which are moved around the vehicle under a drenching spray of water and soap or detergent to remove dirt and grease. The washed vehicle is given a spray of clean rinse water, and is then moved to a drying station. Finally, after being washed and dried, the conveyor pushes the vehicle from the washing system.

A conveyor typically includes a set of guide rails to direct the vehicle's tires. Once in the conveyor, chain-pulled rollers engage with the tires to push the vehicle through the guide rails and the washing system. Provided that all of the tires are properly aligned with the rails, the vehicle will easily pass through conveyor with no damage to the vehicle or conveyor system. However, a misaligned vehicle can be problematic for the conveyor and/or vehicle. For example, in many cases, the entrance to the conveyor follows a turn that is required due to a small lot size or entrance point. When turning the vehicle into a conveyor, driver error can cause the front and/or rear tire to enter the conveyor at an angle. As is often the case, directing the front tires can be rather easy for a driver; however, rear tire alignment is considerably more difficult for the average driver and can result in misalignment. Such misalignment can cause the vehicle to "jump the curb" as it enters the conveyor. As can be appreciated, forcing a vehicle to jump a curb to enter a set of guide rails could be damaging to both the vehicle and conveyor system.

To prevent such misalignment, most conveyor systems require a minimum straight-entry run prior to introduction to the guide rails. The straight-entry run provides space for a driver to straighten the vehicle and align the vehicle's tires with the guide rails. While an elongated straight-entry run is ideal, lot and land size may limit the amount of space that is available for a suitable run.

Thus, a continuing need exists for a system for aligning a vehicle and the vehicle's tires for introduction into a conveyor of a vehicle washing system while reducing the length of the minimum straight-entry run.

SUMMARY OF INVENTION

While considering the failure of others to make use of all of the above components in this technology space, the inventor unexpectedly realized that a correlator would safely and efficiently align a vehicle by altering a position of the vehicle tires prior to introduction into a conveyer of a vehicle washing system.

The correlator includes a frame and a first belt attached with the frame. The first belt is attached with the frame such that a vehicle tire positioned on the first belt can be moved laterally (e.g., from side-to-side, left-to-right, right-to-left, etc.). A first set of track rollers are rotatably attached with the frame such that first belt is rotatably attached with the frame as being wrapped around the first set of track rollers. Additionally, a set of idler rollers is rotatably attached with the frame such that the idler rollers engage with the belt between the first set of track rollers.

Further, a first slider plate is attached with the frame. The first belt includes an upper, top surface and an upper, bottom surface, with the first slider plate attached with the frame such the first belt wraps around the first slider plate with the upper, bottom surface of the first belt residing on the first slider plate.

In another aspect, both a second slider plate and a second set of track rollers are attached with the frame. Additionally, a second belt having an upper, top surface and an upper, bottom surface, is wrapped around the second set of track rollers and the second slider plate such that the upper, bottom surface of the second belt resides on the second slider plate.

The first and second belts are rotatably attached with the frame such that a gap exists between the first and second belts. To prevent injury or otherwise prevent items from falling into the gap, a bearing bar is attached with the frame in the gap between the first and second belts.

To direct the tire, a set of angled curb rails is attached with the frame such that the angled curb rails reside over the first belt, with the first belt being freely rotatable below the angled curb rails. Thus, when a tire is pulled into the angled curb rails (which are fixedly attached over the first belt), the forward pull against the angled curb rail creates a lateral force (because the curb rails are at an angle with respect to the forward direction) against the tire that causes the belt to rotate and shift the position of the vehicle, thereby aligning the vehicle with the vehicle washing system's guide railes.

Finally, as can be appreciated by one in the art, the present invention also comprises a method for forming and using the invention described herein. For example, the present invention includes a method for introducing vehicle tires into a conveyor of a vehicle washing system. The method includes a plurality of acts, such as causing a conveyor to engage with a vehicle's front tire and move the vehicle into the conveyor to cause the vehicle's rear tire to engage with a correlator (the correlator having a first belt rotatably attached with a frame). Additionally, the vehicle's rear tire is received onto the first belt, with the first belt moving laterally (e.g., from side-to-side, left-to-right, right-to-left, etc.) to align the vehicle's rear tire with the conveyor.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 is an illustration of a track roller according to the present invention;

FIG. 5 is an illustration of an idler roller according to the present invention;

FIG. 6A is a top-view illustration of the correlator according to the present invention;

FIG. 6B is a bottom-view illustration of the correlator according to the present invention;

FIG. 7B is an close-up view illustration of the track roller, as depicted in the cross-sectional view of FIG. 7A;

DETAILED DESCRIPTION

The present invention relates to a correlator and, more particularly, to a correlator for altering a position of vehicle tires prior to introduction into a conveyer of a vehicle washing system. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Introduction

Figure 1:
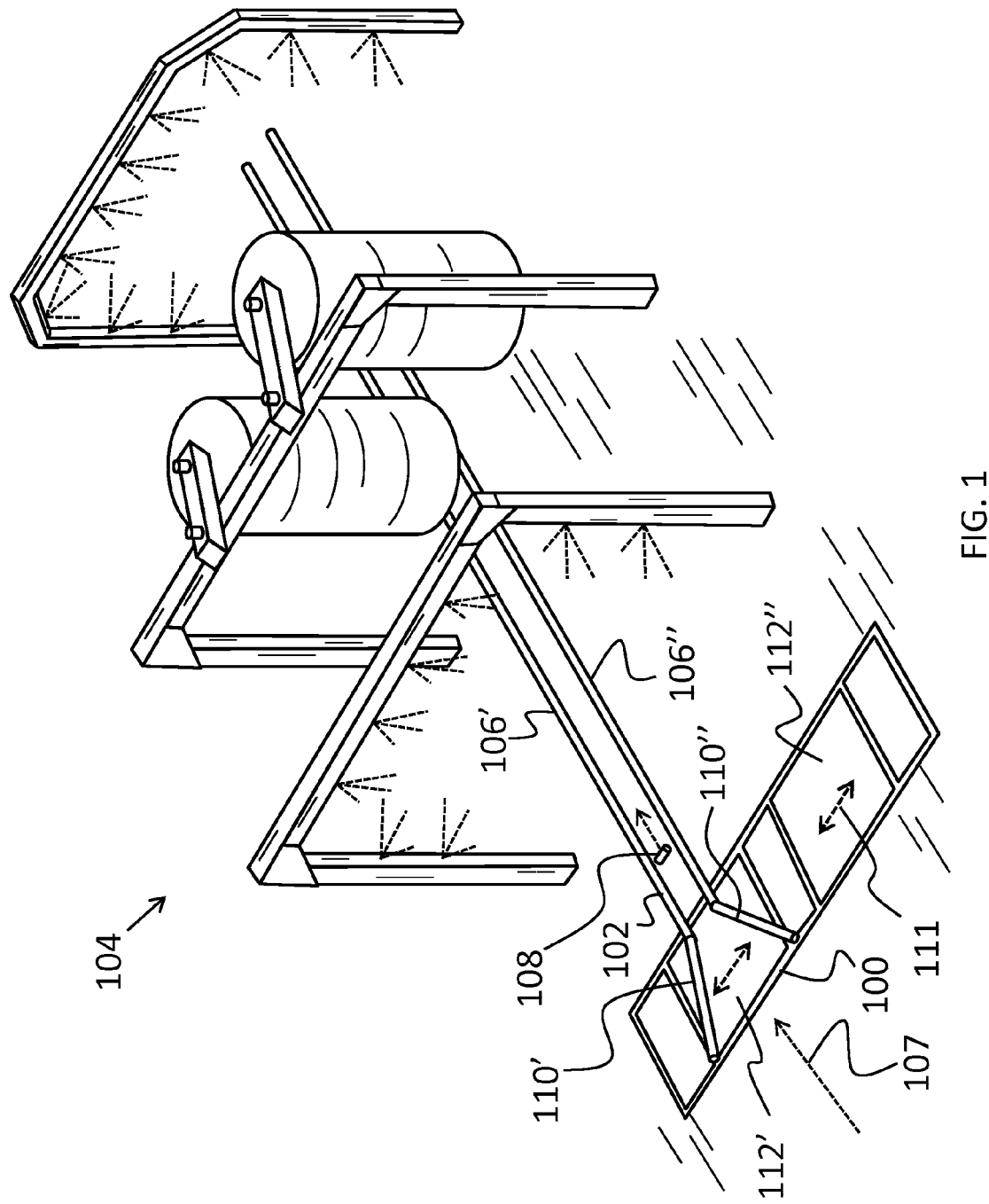
FIG. 1 is an illustration of a vehicle washing system and a correlator according to the present invention.

As shown in FIG. 1, the present invention is directed to a correlator 100 for introducing vehicle tires into a conveyer 102 of a vehicle washing system 104. A conveyer 102 typically includes a set of guide rails 106' and 106" to direct the vehicle's tires through the vehicle washing system 104. A roller system, such as a chain-pulled roller 108, is used to engage with the tires to push the vehicle through the guide rails 106' and 106" and the washing system 104. Provided that all of the tires are properly aligned with the rails 106' and 106", the vehicle will easily pass through conveyer 102 with no damage to the vehicle and/or conveyer system.

As noted above, when introducing 107 tires into a conveyer 102, it is desirable to have the tires aligned with the guide rails 106' and 106". To initiate the alignment, the guide rails 106' and 106" include angled curb rails 110' and 110", respectively. For example, the guide rails 106' and 106" are often relatively narrow and can be difficult for a driver to perfectly align with the vehicle's tires while driving the vehicle onto the conveyer 102. As such, the angled curb rails 110' and 110" help to steer or direct the vehicle's tires into alignment with the guide rails 106' and 106".

While operable for steering the tires toward alignment, the angled curb rails 110' and 110" alone do not shift or alter the actual position of the tire. In some cases, a tire that is out of alignment actually needs its position altered with respect to the guide rails 106' and 106". Thus, the present invention includes the correlator 100 for altering the position of the vehicle prior to introduction into the conveyer 102, thereby assisting in the alignment of the vehicle's tires with the guide rails 106' and 106".

(2) Specific Details

As shown in FIG. 1, the correlator 100 is formed to laterally 111 move the position of a vehicle. In doing so, the correlator 100 can include any suitable mechanism or device that is operable for laterally 111 moving a vehicle or a portion of a vehicle. For example, the correlator 100 can be formed to include a series of adjacently positioned rollers that would allow a vehicle to slide laterally 111.

As another example, the correlator 100 includes a first and second laterally 111 mobile belt 112' and 112", respectively. As can be appreciated by one skilled in the art, any suitable number of independently rotatable belts 112 can be used to alter the position of a vehicle; however, two is desirable due to the left and right tires of a vehicle. The belts 112' and 112" are free moving and laterally 111 mobile (rotatable) to shift the actual position of the vehicle. For example, if a driver were to successfully drive the front, left tire of a vehicle into the guide rails 106' and 106", the roller 108 would rise from behind the front tire to engage the tire and push the vehicle into the vehicle washing system 104. As the rear, left tire of the vehicle approaches the guide rails 106' and 106", it may be that the rear tire is not aligned with the guide rails 106' and 106".

For example, as the rear tire of the vehicle is pulled onto the belts 112' and 112" and the rear tire engages with the angled curb rails 110' and 110", the belts 112' and 112" move to the left or right (i.e., laterally 111) to cause the rear of the vehicle to move and align with the guide rails 106' and 106". It should be understood that the belts 112' and 112" are free-rolling, and that the force of the tire being pulled forward by the roller 108 and the lateral 111 force exerted on the tire due to the angled curb rail 110' or 110" will cause the belts 112' or 112" to rotate and move the tire laterally 111.

It should be noted that the angled curb rails 110' and 110" are attached with or around the correlator 100 such that they reside over the first belt 112', with the first belt 112' being freely rotatable below the angled curb rails 110' and 110". For example, the angled curb rails 110' and 110" are fixedly attached with the frame (depicted as element 204 in FIG. 2) and pass over the belt 112'. Alternatively, the curb rails 110' and 110" are attached with another support (such as a ground surface) adjacent to the frame so that the curb rails 110' and 110" pass over the frame and belt 112'.

Figure 2:
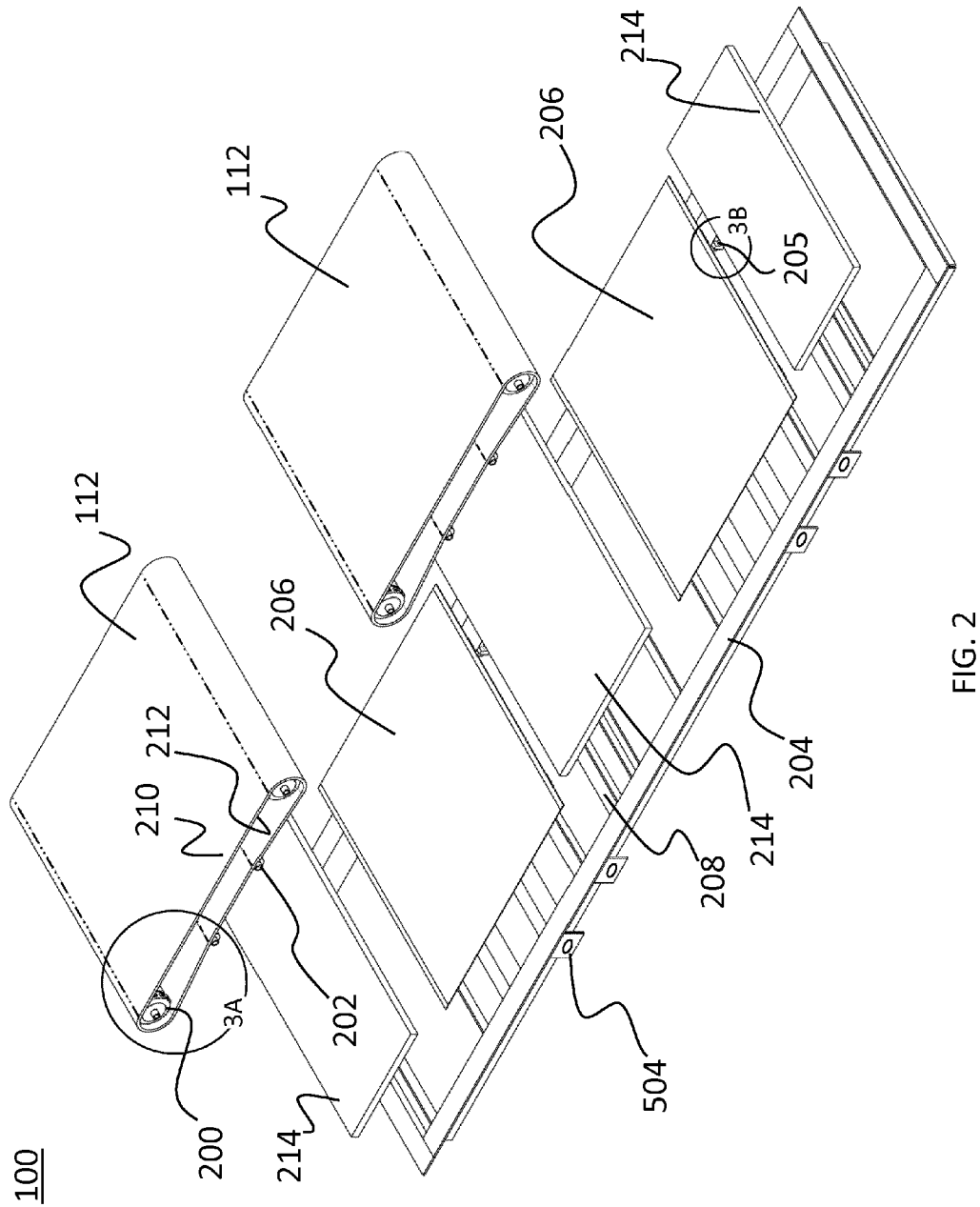
FIG. 2 is an exploded-view illustration of a correlator according to the present invention.

For further understanding, FIG. 2 is an exploded-view illustration of a correlator 100 according to the present invention. As shown, the correlator 100 includes any suitable number of belts 112 (desirably two). Each belt 112 includes a set of rollers, around which the belt 112 is wrapped and allowed to rotate. As a non-limiting example, each belt 112 includes two track rollers 200 and two idler rollers 202. The belt 112 is any suitable belting that is capable of laterally moving a portion of a vehicle, a non-limiting example of which includes a single-link chain belting that is approximately 0.3125 inches thick and 35.875 inches wide.

The belts 112 are attached with a stable surface that is capable of supporting the weight of a passing vehicle. As a non-limiting example, the belts 112 are supported by a correlator frame 204 (e.g., a welded frame made of steel). For example, the frame 204 includes saddle supports 205 to support the ends of each track roller 200.

To support the vehicle while resting on the belts 112, the correlator 100 includes slider plates 206. Each slider plate 206 is attached with the frame 204 and passes through a belt 112. For example, each slider plate 206 rests upon frame angle brackets 208. The belt 112 includes an upper, top surface 210 and an upper, bottom surface 212. The belt 112 wraps around the slider plate 206 such that the upper, bottom surface 212 resides on the top of the slider plate 206. Thus, as the belt 112 rotates, the upper, bottom surface 212 of the belt 112 slides across the top of the slider plate 206, with the slider plate 206 preventing deformation of the belt 112 due to the weight of the vehicle. The slider plate 206 is formed of any suitably rigid material, a non-limiting example of which includes steel.

As can be appreciated, gaps are likely formed between each belt 112. To fill such gaps, any suitable gap filler can be employed. For example, bearing bars 214 can be affixed with the frame 204 to fill any spaces between and around the belts 112. Each bearing bar 214 is any suitable rigid and stable platform, a non-limiting example of which includes a fiberglass grating that is one inch thick and includes a width and length of 16.75 inches and 36 inches, respectively.

As noted above, the belt 112 is wrapped around a track roller 200 (or set of track rollers) to support and rotate the belt 112. FIG. 3A provides a close-up view of a track roller 200, around which the belt 112 is wrapped. To prevent the belt 112 from slipping and to assist rotation of the belt, the roller 200 can include teeth 300 (e.g., sprockets, protrusions, etc.). The teeth 300 can be formed to engage with an inner surface 302 of the belt 112. The inner surface 302 is formed in any suitable manner to engage with the teeth 300. As a non-limiting example, the inner surface 302 can be smooth or textured, with the teeth 300 pressing into the pliable belt 112 to grasp and engage the belt 112. As yet another non-limiting example, the belt 112 includes a series of mating markings 304 formed in the inner surface 302 to mate with the teeth 300. For example, the mating markings 304 are recessions that mate with the teeth 300 as the track roller 200 rotates.

Also depicted in FIG. 3A is an idler roller 202. The idler roller 202 is used to support a bottom portion 306 of the belt 112 to prevent it from sagging. Further, through the use of the idler roller 202, the belt 112 is able to rotate around the track rollers 200 more freely because a portion of the weight of the belt 112 is supported by the idler roller 202, thereby maintaining the rotational fluidity/integrity of the belt 112.

Figure 3B:
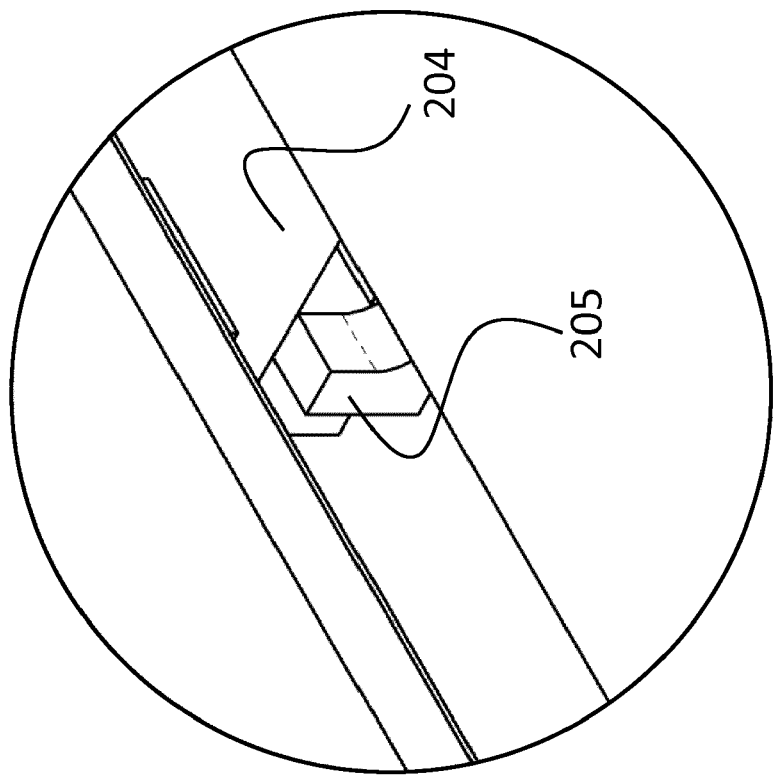
FIG. 3B is a close-up view illustration of a saddle support for a roller according to the present invention.
Figure 3A:
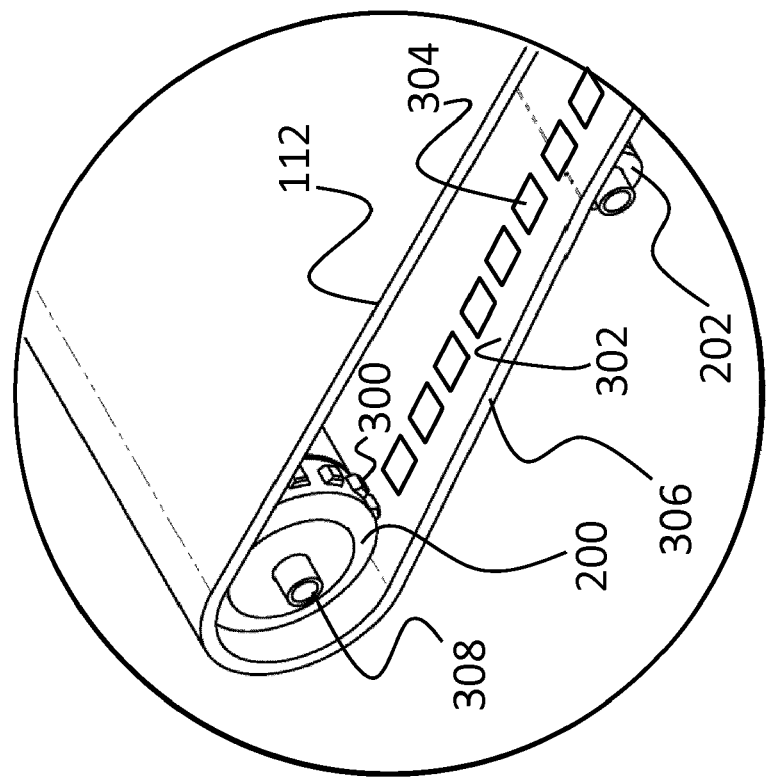
FIG. 3A is a close-up view illustration of a track roller and belt according to the present invention.

Also as noted above, the track roller 200 is attached with the frame using any suitable mechanism, such as a saddle support (illustrated in FIG. 3B). To attach with the saddle support, each end of the track roller 200 includes a protruding pin 308 (or other suitable mechanism or device) that will rest in the saddle support.

For further understanding, FIG. 3B provides an illustration of a saddle support 205 that is attached with the frame 204. The saddle support 205 is any suitable mechanism or device that provides for a rotational connection between the frame 204 and track rollers. As a non-limiting example, the saddle support 205 is a u-shaped brace that allows the protruding pin (illustrated as element 308 in FIG. 3A) to rest and rotate therein.

As noted above, the belt 112 rotates around track rollers 200. The track roller 200 is any suitable mechanism or device that is operable for assisting the rotation of the belt 112. As a non-limiting example and as depicted in FIG. 4, the track roller 200 includes a cylindrical spindle 400 that is straddled by a sprocket 402 with teeth 300 and an end cap 404. It should be noted that for illustrative purposes, FIG. 4 depicts two configurations. One in which the sprocket 402 is between the spindle 400 and end cap 404 and one in which the end cap 404 is positioned between the sprocket 402 and spindle 400. Desirably, on both ends of the track roller 200, the sprocket 402 is positioned between the spindle 400 and end cap 404.

FIG. 5 provides an illustration of an idler roller 202. As can be appreciated by one skilled in the art, the idler roller 202 is any suitable mechanism or device that is operable for supporting the belt 112 to prevent the belt 112 from sagging. As a non-limiting example, the idler roller 202 includes a cylindrical spindle 500 with two end caps 502. The end caps 502 are used to affix the idler roller 202 with idler roller brackets (depicted as element 504 in FIG. 2).

The components described above are assembled to collectively form the correlator 100 of the present invention. For further understanding, FIGS. 6A and 6B provide top and bottom-views, respectively, of the correlator 100. As shown, the correlator 100 includes belts 112 that are movably attached with the frame via rollers. While the track rollers are concealed by the belts 112 (as the belts 112 are wrapped around the track rollers), the idler rollers 202 can be seen in FIG. 6B. Also shown are the bearing bars 214 attached with the frame 204.

Figure 7A:
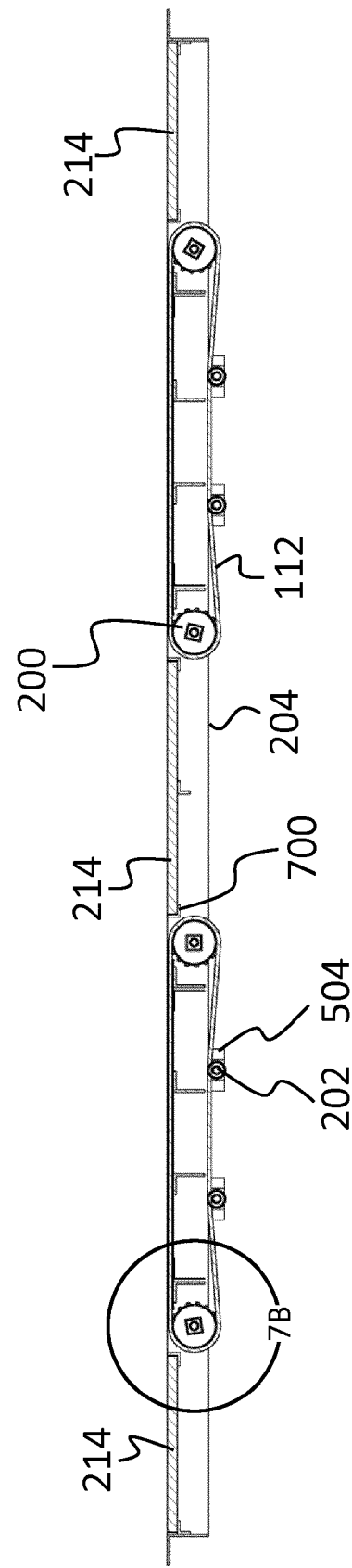
FIG. 7A is a cross-sectional, side-view illustration of the correlator according to the present invention, taken from line I-I of FIG. 6A.

For further illustration, FIG. 7A is a cross-sectional, side-view of the correlator 100, taken from line I-I of FIG. 6A. Again, the belts 112 are movably attached with the frame 204 via track rollers 200. The idler rollers 202 are rotatably attached with the frame 204 via the idler roller brackets 504. Further, the bearing bars 214 are depicted as being affixed with the frame 204 using an L-shaped bracket 700 or any other suitable attachment mechanism.

FIG. 7B is a close-up view of the track roller 200, as depicted in the cross-sectional view of FIG. 7A. As noted above and as depicted in FIG. 7A, to support the vehicle while resting on the belts 112, slider plates 206 are included. The slider plates 206 are attached with the frame 204 via any suitable mechanism or device, such as the frame angle brackets 208. Importantly, the belt 112 wraps around the slider plate 206 such that the upper, bottom surface 212 resides on the top of the slider plate 206. Thus, as the belt 112 rotates, the upper, bottom surface 212 of the belt 112 slides across the top of the slider plate 206.

Figure 8:
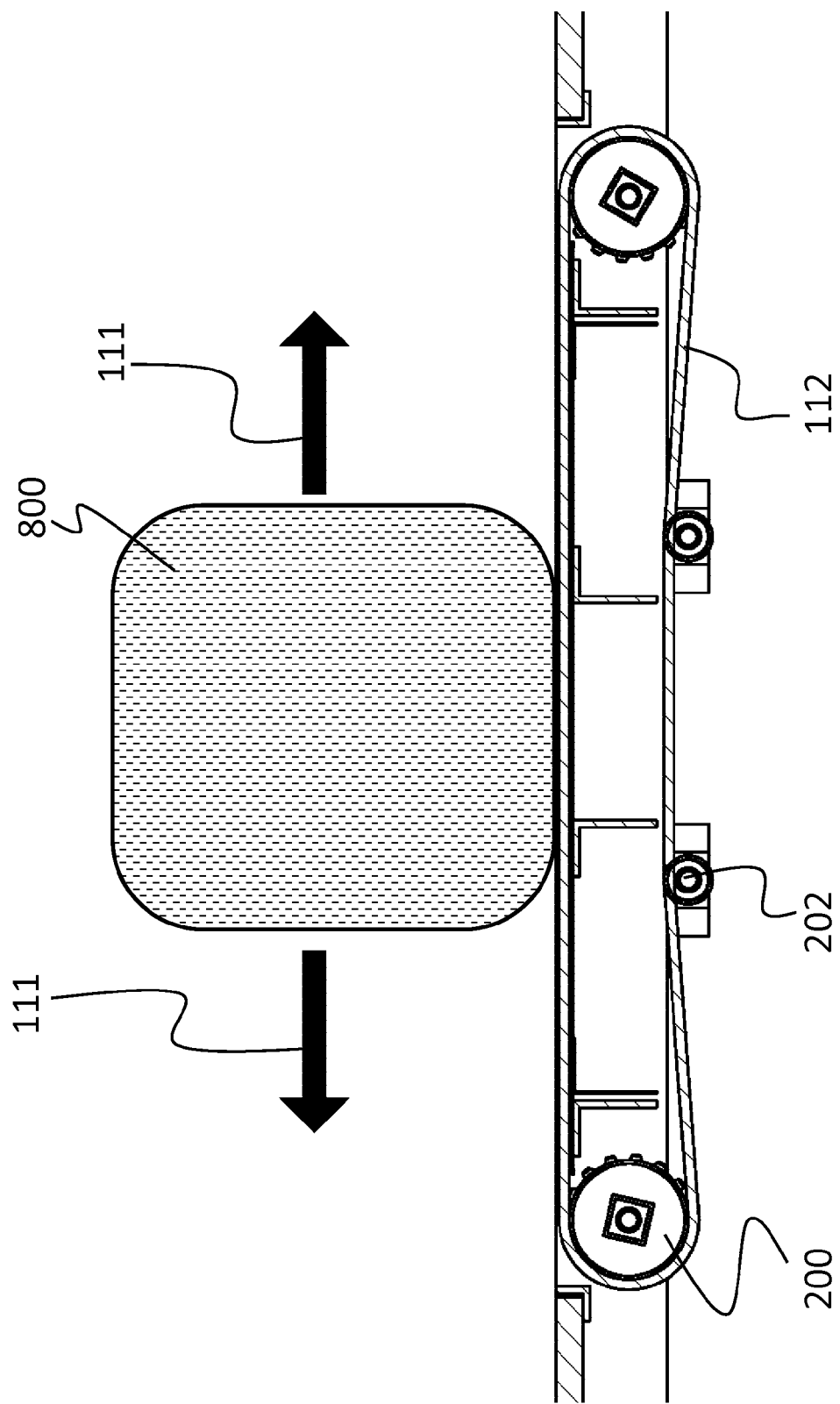
FIG. 8 is a close-up view illustration of the rollers and belt as depicted in the cross-sectional view of FIG. 7A.

FIG. 8 is a close-up view illustration of the rollers (i.e., track rollers 200 and idler rollers 202) and belt 112 as depicted in the cross-sectional view of FIG. 7A. As shown in FIG. 8, when a tire 800 is positioned on top of the belt 112, the belt 112 can rotate around the track rollers 200 to cause lateral 111 movement of the tire 800. Thus, by laterally 111 moving the tire 800, the actual position of the vehicle (to which the tire 800 is attached) is moved or shifted.

Figure 9:
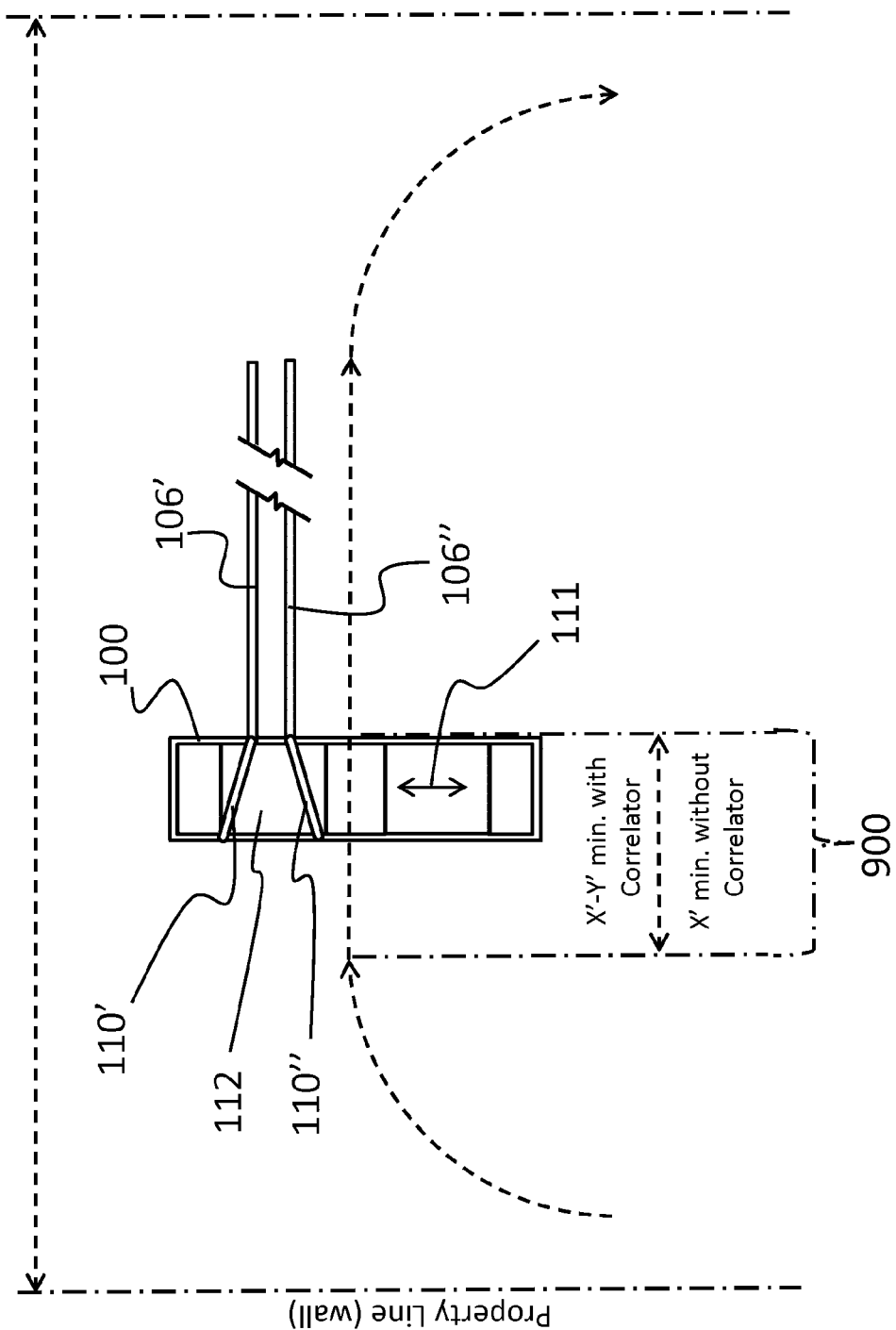
FIG. 9 is an aerial-view illustration, depicting an affect of the correlator on a straight-run entry at an installation site.

As shown in FIG. 9, the effect of shifting the position of the vehicle is that it enables a vehicle to be more easily aligned with the guide rails 106' and 106" of the vehicle washing system. As depicted in the aerial-view illustration of FIG. 9, a straight-run entry 900 is desirable when introducing a vehicle into the guide rails 106' and 106". The straight-run entry 900 is a space in front of the guide rails 106 and 106" that allows a driver to manipulate the vehicle into alignment with the guide rails 106' and 106". To assist in such alignment, the angled curb rails 110' and 110" direct the tires of the vehicle into the guide rails 106' and 106". Even with the angled curb rails 110' and 110", a minimum straight-run entry 900 is required. For example, a standard vehicle washing system requires a minimum straight-run entry 900 of X feet (e.g., twelve feet). Alternatively, using the correlator 100 of the present invention, when a vehicle's rear tires are positioned on top of the belt 112 and pulled into the angled curb rails 110' or 110", the rear of the vehicle is actually shifted laterally 111. As such, a vehicle that approaches the angled curb rails 110' and 110" at an angle can be shifted to align with the guide rails 106' and 106". Due to the ability to actually shift the position of the vehicle, use of the correlator 100 decreases the minimum straight-run entry 900 by Y feet (e.g., five feet). As a non-limiting example, a vehicle washing system without a correlator 100 needs a straight-run entry of twelve feet, while a vehicle washing system with a correlator 100 needs a straight-run entry of seven feet.

In addition to decreasing the minimum distance required for the straight-run entry 900, the correlator 100 decreases the likelihood of damage to the conveyor and/or vehicle tires. For example, a vehicle entering the guide rails 106' and 106" at an angle (in a system without a correlator 100) may be required to "jump" a curb to align with the guide rails 106' and 106". Alternatively, with the correlator 100, the vehicle is shifted into alignment with the guide rails 106' and 106", thereby decreasing the likelihood of damage to any components.

What is claimed is:

1. A correlator for introducing vehicle tires into a conveyor of a vehicle washing system, comprising:
   a frame; and
   a first belt attached with the frame, the first belt being attached with the frame such that a vehicle tire positioned on the first belt can be moved laterally;
   a first set of track rollers rotatably attached with the frame such that first belt is rotatably attached with the frame as being wrapped around the first set of track rollers; and
   a first slider plate attached with the frame, wherein the first belt includes an upper, top surface and an upper, bottom surface, with the first slider plate attached with the frame such the first belt wraps around the first slider plate with the upper, bottom surface of the first belt residing on the first slider plate.

2. The correlator as set forth in claim 1, further comprising a set of idler rollers rotatably attached with the frame such that the idler rollers engage with the belt between the first set of track rollers.

3. The correlator as set forth in claim 2, further comprising:
   a second slider plate attached with the frame;
   a second set of track rollers rotatably attached with the frame; and
   a second belt having an upper, top surface and an upper, bottom surface, the second belt wrapped around the second set of track rollers and the second slider plate such that the upper, bottom surface of the second belt resides on the second slider plate.

4. The correlator as set forth in claim 3, wherein the first and second belts are rotatably attached with the frame such that a gap exists between the first and second belts and, further comprising a bearing bar attached with the frame in the gap between the first and second belts.

5. The correlator as set forth in claim 4, further comprising a set of angled curb rails attached with the frame such that the angled curb rails reside over the first belt, with the first belt being freely rotatable below the angled curb rails.

6. A correlator for introducing vehicle tires into a conveyer of a vehicle washing system, comprising:
   a frame;
   a first belt attached with the frame, the first belt being attached with the frame such that a vehicle tire positioned on the first belt can be moved laterally;
   a first slider plate attached with the frame, wherein the first belt includes an upper, top surface and an upper, bottom surface, with the first slider plate attached with the frame such the first belt wraps around the first slider plate with the upper, bottom surface of the first belt residing on the first slider plate;
   a second slider plate attached with the frame; and
   a second belt having an upper, top surface and an upper, bottom surface, the second belt wrapped around the second slider plate such that the upper, bottom surface of the second belt resides on the second slider plate.

7. The correlator as set forth in claim 6, wherein the first and second belts are rotatably attached with the frame such that a gap exists between the first and second belts and, further comprising a bearing bar attached with the frame in the gap between the first and second belts.

8. A correlator for introducing vehicle tires into a conveyer of a vehicle washing system, comprising:
   a frame;
   a first belt attached with the frame, the first belt being attached with the frame such that a vehicle tire positioned on the first belt can be moved laterally; and
   a first slider plate attached with the frame, wherein the first belt includes an upper, top surface and an upper, bottom surface, with the first slider plate attached with the frame such the first belt wraps around the first slider plate with the upper, bottom surface of the first belt residing on the first slider plate.

* * * * *